(12) United States Patent
Taneichi

(10) Patent No.: US 11,448,251 B2
(45) Date of Patent: Sep. 20, 2022

(54) BOLT CONNECTOR

(71) Applicant: Kaoru Taneichi, Kanagawa (JP)

(72) Inventor: Kaoru Taneichi, Kanagawa (JP)

( * ) Notice: Subject to any disclaimer, the term of this patent is extended or adjusted under 35 U.S.C. 154(b) by 239 days.

(21) Appl. No.: 16/769,070

(22) PCT Filed: Oct. 31, 2018

(86) PCT No.: PCT/JP2018/040455
§ 371 (c)(1),
(2) Date: Jun. 2, 2020

(87) PCT Pub. No.: WO2019/123849
PCT Pub. Date: Jun. 27, 2019

(65) Prior Publication Data
US 2021/0231147 A1 Jul. 29, 2021

(30) Foreign Application Priority Data

Dec. 18, 2017 (JP) .............................. JP2017-241360

(51) Int. Cl.
*F16B 7/06* (2006.01)

(52) U.S. Cl.
CPC ............... *F16B 7/06* (2013.01); *Y10T 403/29* (2015.01)

(58) Field of Classification Search
CPC ........ F16B 5/0266; F16B 5/0275; F16B 7/06; F16B 7/18; F16B 7/182; F16B 7/185; F16B 37/12; Y10T 403/29; Y10T 403/291; Y10T 403/293; Y10T 403/295; Y10T 403/56; Y10T 403/5733; Y10T 403/5746; Y10T 403/5766; F16G 11/12

USPC .......................................... 411/178, 389, 438
See application file for complete search history.

(56) References Cited

U.S. PATENT DOCUMENTS

| | | | | | |
|---|---|---|---|---|---|
| 647,988 | A | * | 4/1900 | Rozansky | F16G 11/12 403/46 |
| 1,480,253 | A | * | 1/1924 | Fisher | F16B 7/06 403/44 |
| 2,262,450 | A | * | 11/1941 | Camines | F16B 39/32 411/282 |
| 2,278,320 | A | * | 3/1942 | Kath | F16B 7/06 403/44 |

(Continued)

FOREIGN PATENT DOCUMENTS

| | | |
|---|---|---|
| JP | S59-168006 U | 11/1984 |
| JP | 5-202990 A | 8/1993 |

(Continued)

*Primary Examiner* — Josh Skroupa
*Assistant Examiner* — Kevin J Baynes
(74) *Attorney, Agent, or Firm* — Norris McLaughlin, P.A.

(57) ABSTRACT

An object of the present invention is to provide a bolt connector that enables a bolt to be inserted into a high nut, and is capable of easily maintaining a connection state between the bolt and the nut. The bolt connector connects two bolts and is configured by: a high nut that has a female screw portion; and a spring that is partially inserted into the female screw portion. The female screw portion is formed having a larger diameter than an outer diameter of the bolt. The spring is formed into a shape in which the spring is in contact with threads of the female screw portion and a male screw portion of the bolt, in a state in which the bolt or the high nut is rotated and fastened.

6 Claims, 18 Drawing Sheets

(56) References Cited

U.S. PATENT DOCUMENTS

| | | | | |
|---|---|---|---|---|
| 3,010,745 | A | * | 11/1961 | Blomstrand ............ H01R 4/22 403/300 |
| 3,480,060 | A | * | 11/1969 | Sheldon ................ B23P 15/00 411/262 |
| 4,040,326 | A | * | 8/1977 | Breed ................... F16B 37/12 411/929.1 |
| 5,006,023 | A | * | 4/1991 | Kaplan ................. F16B 37/12 411/17 |
| 5,098,261 | A | * | 3/1992 | Bertoncini ............ F04B 43/082 417/474 |
| 5,193,932 | A | * | 3/1993 | Wu ....................... E04C 5/165 403/309 |
| 5,782,078 | A | * | 7/1998 | Brantley ............... F16B 7/06 60/797 |
| 6,146,073 | A | * | 11/2000 | Kobusch ............... F16B 37/12 411/929.1 |
| 6,276,883 | B1 | * | 8/2001 | Unsworth .............. F16B 37/12 411/16 |
| 6,719,478 | B2 | * | 4/2004 | Gregel ................. E04G 21/122 403/309 |
| 6,953,313 | B2 | | 10/2005 | Tylosky |
| 2009/0317209 | A1 | * | 12/2009 | Grubert ................ F16B 37/125 411/387.4 |
| 2013/0230350 | A1 | * | 9/2013 | Kim ...................... E04C 5/166 403/327 |
| 2014/0023453 | A1 | * | 1/2014 | Hollensen ............. F16B 37/12 411/178 |

FOREIGN PATENT DOCUMENTS

| | | |
|---|---|---|
| JP | H06-69428 U | 9/1994 |
| JP | 2007-009417 A | 1/2007 |
| JP | 4530758 B2 | 8/2010 |
| JP | 4881157 B2 | 2/2012 |
| JP | 2015-218816 A | 12/2015 |

* cited by examiner

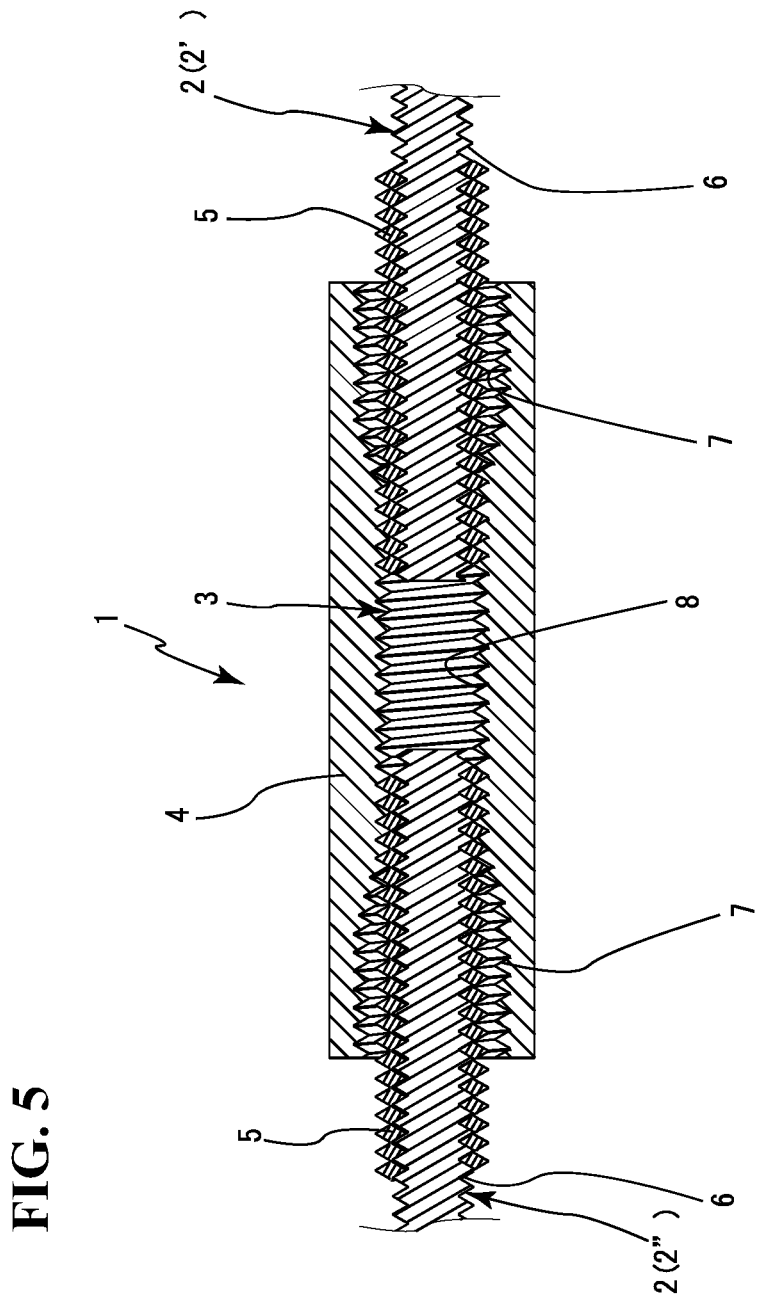

BOLT CONNECTOR

BACKGROUND OF THE INVENTION

1. Field of the Invention

The present invention relates to a bolt connector that connects long bolts that are mainly used in wooden housing.

2. Description of the Related Art

Conventionally, a high nut (long nut) and the like are typically known as that which connects long bolts that are used in wooden housing. However, when bolt through-holes are formed in upper-level and lower-level beams, a long bolt is passed through each bolt through-hole, and the long bolts are connected by a high nut or the like, the centers of the bolt through-holes in the beams often become misaligned because a distance of several meters is present between the upper level and the lower level. As a result, the axial centers of the bolts become misaligned, and a disadvantage arises in that insertion of the bolt into the high nut per se becomes difficult.

In such cases, when bolts that have a thin diameter are used, a worker or the like draws the bolts together and bends the bolts, thereby connecting the bolts to the high nut. However, when bolts that have a large diameter or the like are used, the bolts are difficult to bend. When the bolts are misaligned, connection by the high nut becomes difficult.

In addition, to prevent loosening of a screwed portion of between the long bolt and the high nut that are connected as described above, a method in which locking is performed by shear force being applied to the screwed portion between the bolt and the nut using a so-called double nut or the like is commonly known.

However, when the double nut is used, this nut is also required to be screwed to the long bolt. A disadvantage arises in that there is the labor of moving the nut in an axial direction of the bolt.

SUMMARY OF THE INVENTION

In light of conventional disadvantages such as those described above, an object of the present invention is to provide a bolt connector and a bolt connection method in which a bolt can be easily inserted into a high nut, and a screwed connection between the bolt and the nut can be easily maintained.

The object described above, other objects, and novel features of the present invention will become more completely clear when the following description is read with reference to the accompanying drawings.

However, the drawings are mainly for description and do not limit the technical scope of the present invention.

To achieve the above-described object, a bolt connector of the present invention is a bolt connector that connects two bolts. The bolt connector is configured by: a high nut that has a female screw portion; and a spring that is partially inserted into the female screw portion. The female screw portion is formed having a larger diameter than an outer diameter of the bolt. The spring is formed into a shape in which the spring is in contact with threads of the female screw portion and a male screw portion of the bolt, in a state in which the bolt or the high nut is rotated and fastened.

Effects of the Invention

As is clear from the description above, the present invention achieves the effects listed below:

(1) According to a first aspect and a seventh aspect of the invention, the female screw portion is formed such that a portion of the spring is inserted into the female screw portion. In addition, the female screw portion is formed having a larger diameter than the outer diameter of the bolt. Therefore, even when axial centers of upper- and lower-level long bolts are misaligned, the bolt is guided by the spring that protrudes from the female screw portion. Misalignment can thereby be resolved.

(2) The spring is formed into a shape in which the spring is in contact with the threads of the female screw portion and the male screw portion of the bolt, in a state in which the bolt is fastened. Therefore, backlash gap between the male screw portion and the female screw portion is reduced. A locking effect can be achieved.

(3) The female screw portion is formed having a larger diameter than the outer diameter of the bolt. Therefore, the high nut can be moved in a state in which the bolt is inserted, without the bolt or the high nut being rotated. The high nut can be easily moved to a connection position.

(4) In addition, the female screw portion is formed having a large diameter. Therefore, a high joining strength can be achieved, compared to when a nut of a size that is screwed onto the bolt in a typical manner is used.

(5) According to a second aspect of the invention as well, effects similar to those in (1) to (4) can be achieved. In addition, as a result of the large-diameter portions being formed, the bolts can be more easily guided.

(6) According to a third aspect and a fourth aspect of the invention as well, effects similar to those in (1) to (5) can be achieved. In addition, the spring can be placed in even closer contact with the threads of the female screw portion and the male screw portion of the bolt.

Therefore, the backlash gap between the male screw portion and the female screw portion is hardly present. The locking effect can be enhanced.

(7) According to a fifth aspect of the invention as well, effects similar to those in (1) to (6) can be achieved. In addition, fastening and the like can be facilitated.

(8) According to a sixth aspect of the invention as well, effects similar to those in (1) to (7) can be achieved. In addition, insertion of the spring and the like can be facilitated.

BRIEF DESCRIPTION OF THE DRAWINGS

FIGS. 1-3, 4A, 4B, 4C, 5, 6, 7A, 7B, 7C and 8 are explanatory diagrams according to a first embodiment of the present invention.

FIG. 1 is a front view of a bolt connector according to a first embodiment;

FIG. 2 is a cross-sectional view taken along line 2-2 in FIG. 1;

FIG. 3 is an explanatory diagram of a high nut;

FIGS. 4A, 4B and 4C are explanatory diagrams of a state in which a bolt is being screwed into the bolt connector;

FIG. 5 is an explanatory diagram of a state in which the bolt is screwed into the bolt connector;

FIG. 6 is a vertical cross-sectional view of a spring;

FIGS. 7A, 7B and 7C are explanatory diagrams of a state in which the bolt is being connected to the bolt connector in a state of use;

FIG. 8 is an explanatory diagram of a state in which the bolt is connected to the bolt connector in a state of use;

FIG. 9 is a front view of a bolt connector according to a second embodiment;

FIG. 10 is a vertical cross-sectional view of a state in which a bolt is screwed into the bolt connector;

FIG. 11 is a vertical cross-sectional view of a spring;

FIG. 12 is a front view of a bolt connector according to a third embodiment;

FIG. 13 is a vertical cross-sectional view of a state in which a bolt is screwed into the bolt connector;

FIG. 14 is a vertical cross-sectional view of a spring;

FIG. 15 is a front view of a bolt connector in a state in which a bolt is screwed into the bolt connector according to a fourth embodiment;

FIG. 16 is a cross-sectional view taken along line 16-16 in FIG. 15;

FIG. 17 is a cross-sectional view taken along line 17-17 in FIG. 15; and

FIG. 18 is an exploded perspective view of a high nut.

Figure 1:
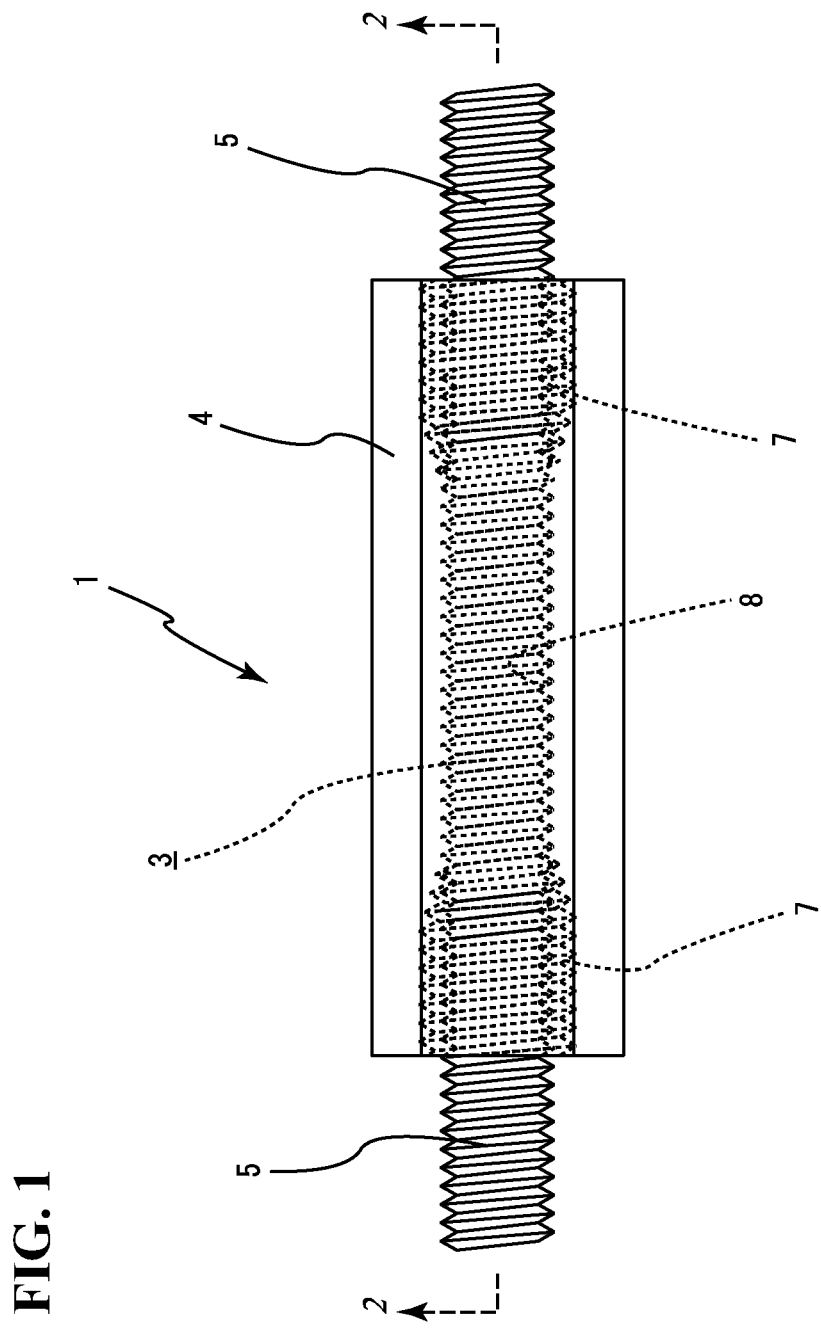

EXPLANATION OF REFERENCE NUMBERS 1, 1A, 1B, 1C: bolt connector
2: bolt
3: female screw portion
4, 4A: high nut
5, 5A, 5B: spring
6: male screw portion
7: large-diameter portion
8: small-diameter portion
9: lower-level beam
10: upper-level beam
11, 11A: nut
12: high-nut main body
13: engaging portion
14: engaging tool

DETAILED DESCRIPTION OF THE PREFERRED EMBODIMENTS

The present invention will hereinafter be described in detail based on embodiments for carrying out the present invention shown in the drawings.

According to a first embodiment for carrying out the present invention shown in FIGS. 1-3, 4A, 4B, 4C, 5, 6, 7A, 7B, 7C and 8, reference number 1 represents a bolt connector that connects one long bolt 2 and another long bolt 2 in a linear direction (such as a vertical direction). For example, the bolt 2 is used in construction of wooden housing.

Figure 8:
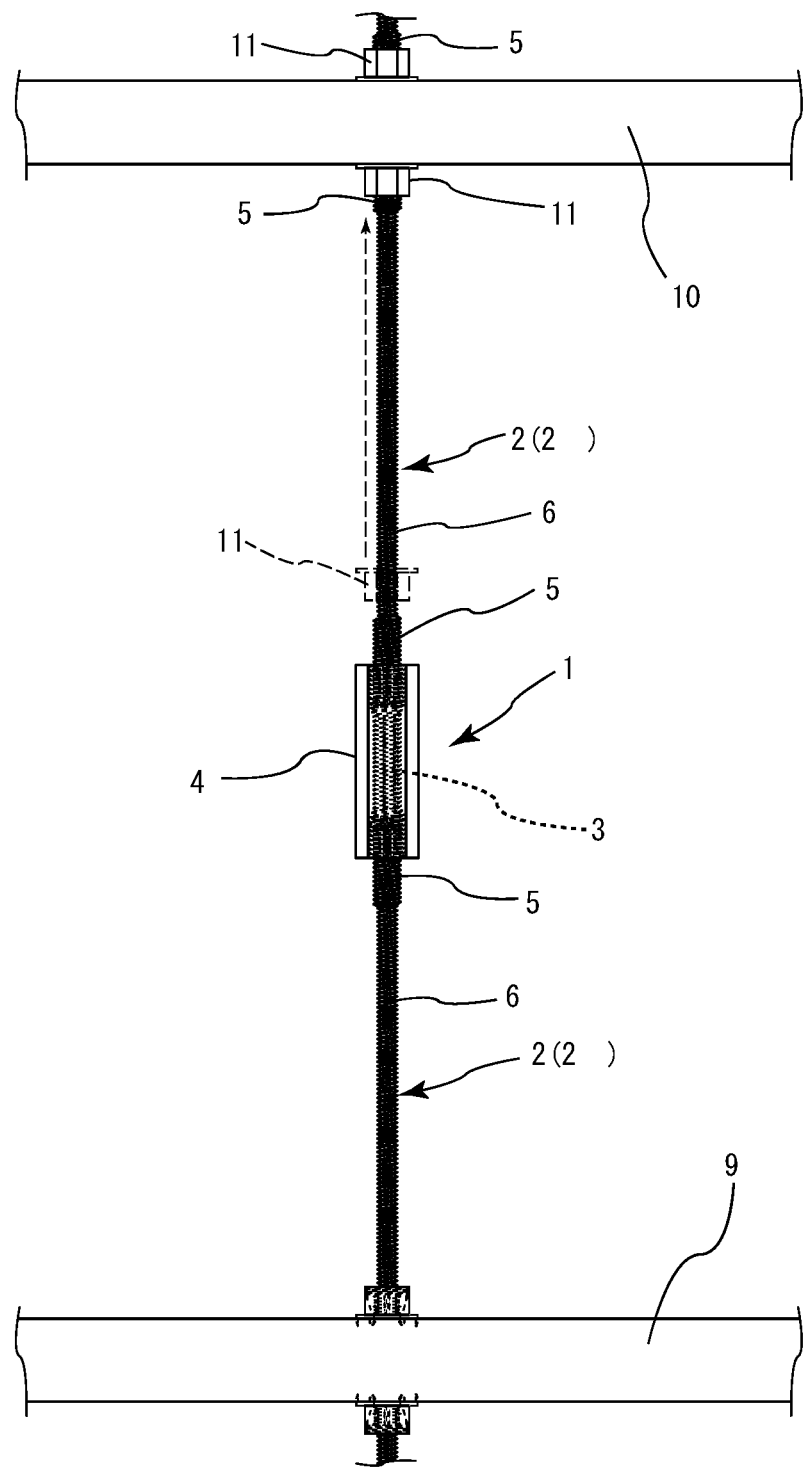

Specifically, as shown in FIG. 8, the bolt connector 1 connects the bolts 2 by being provided in a substantially vertical state between a lower-level beam 9 and an upper-level beam 10.

Figure 2:
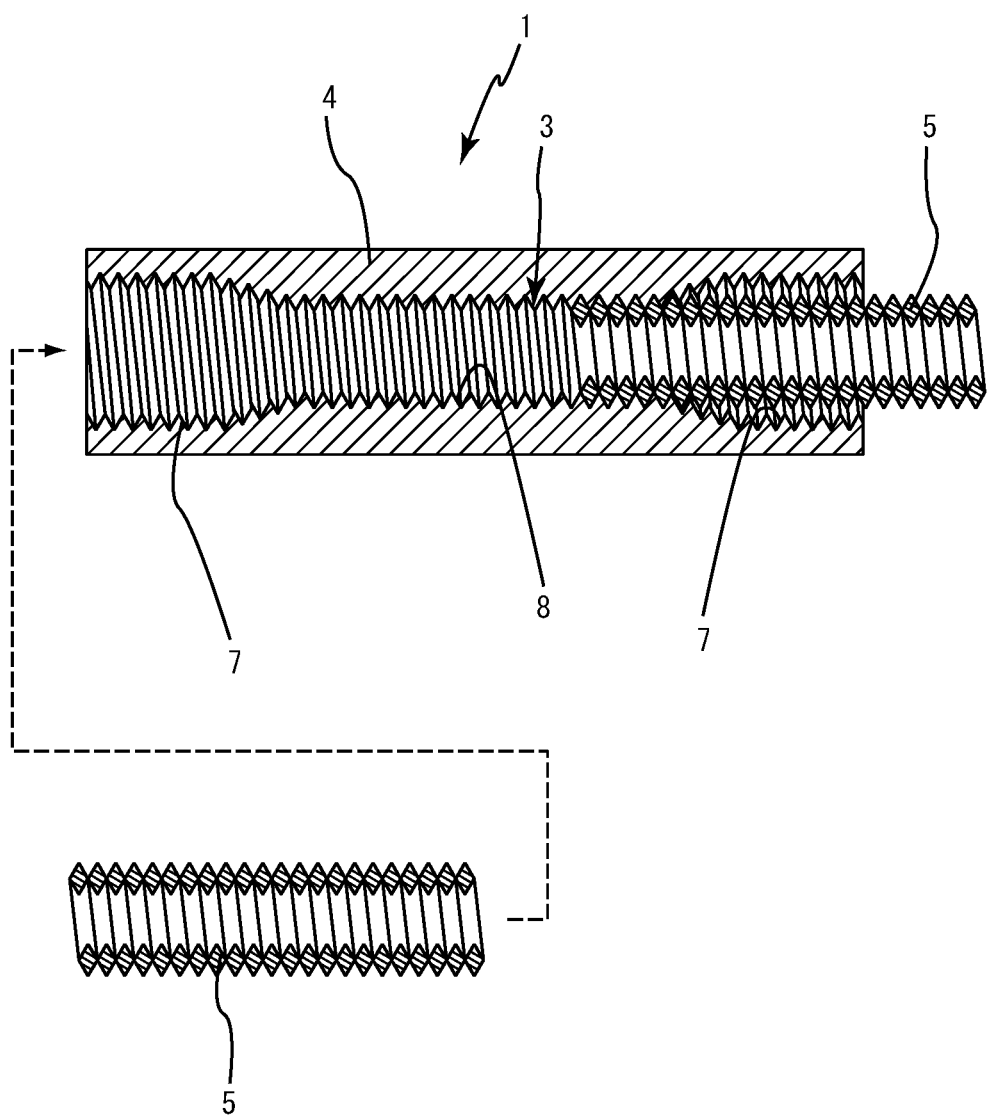

Here, as shown in FIG. 1 and FIG. 2, the bolt connector 1 is configured by a high nut 4 of a predetermined length, and a pair of left and right springs 5 of a predetermined length. The high nut 4 has a female screw portion 3 that is continuously formed from one end surface 4a to another end surface 4b. The springs 5 are respectively inserted into both end portions of the female screw portion 3.

Figure 3:
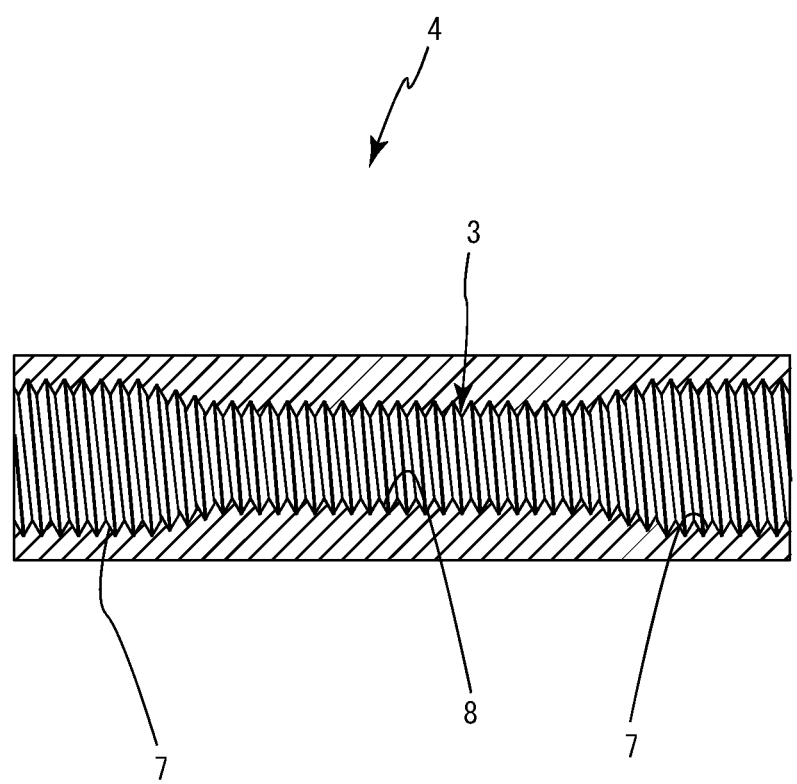

According to the present embodiment, as shown in FIG. 3, the high nut 4 is composed of metal and has an outer shape that is formed into a hexagon. The female screw portion 3 that is continuous from the one end surface 4a to the other end surface 4b is formed in a center portion in an axial direction of the high nut 4.

According to the present embodiment, the female screw portion 3 is formed to be a millimeter screw or an inch screw. Specifically, the female screw portion 3 is formed to be a same type of screw as a male screw portion 6 that is formed in the bolt 2. For example, when the male screw portion 6 in the bolt 2 is a millimeter screw, the female screw portion 3 is also formed to be a millimeter screw.

In addition, a large-diameter portion 7 is formed near each of the both end portions (outer portions) of the female screw portion 3. The large-diameter portion 7 has a larger diameter than an inner portion of the female screw portion 3. At a connecting portion between the large-diameter portion 7 and a small-diameter portion 8 on the inner side, the connection is preferably smooth so that an overall tapered shape is formed.

In addition, even at a smallest portion (the small-diameter portion 8), the inner diameter of the female screw portion 3 is formed to be larger than an outer diameter of the bolt 2. When the bolt 2 is connected, the high nut is not required to be moved by being rotated, and can be easily moved. Furthermore, because the female screw portion is formed so as to have a large diameter, compared to when a nut of a size that is screwed onto the bolt in a typical manner is used, joining strength that is about 20% higher can be achieved.

According to the present embodiment, the spring 5 has a cross-sectional shape that is substantially rhombic. The spring 5 is shaped such that, in a bolt connection state (a state in which the bolt is fastened), the spring 5 is in contact with a thread of the female screw portion 3 and a thread of the male screw portion 6.

The spring 5 is provided such that, in a normal state (before bolt connection), one end portion thereof is positioned near a connecting portion between the large-diameter portion 7 and the small-diameter portion 8, and another end portion protrudes from the high nut 4.

Figure 4A:
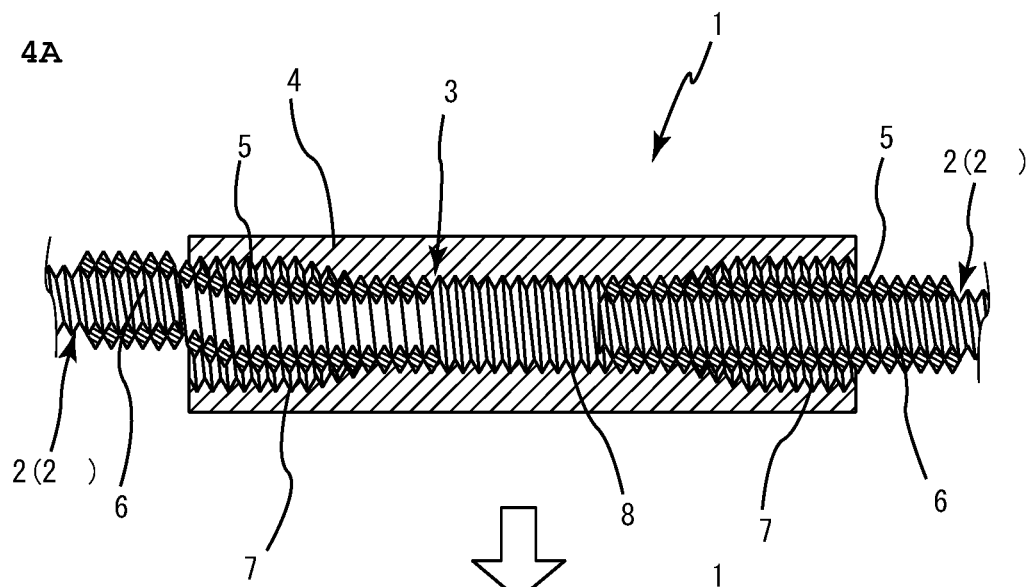
Figure 4B:
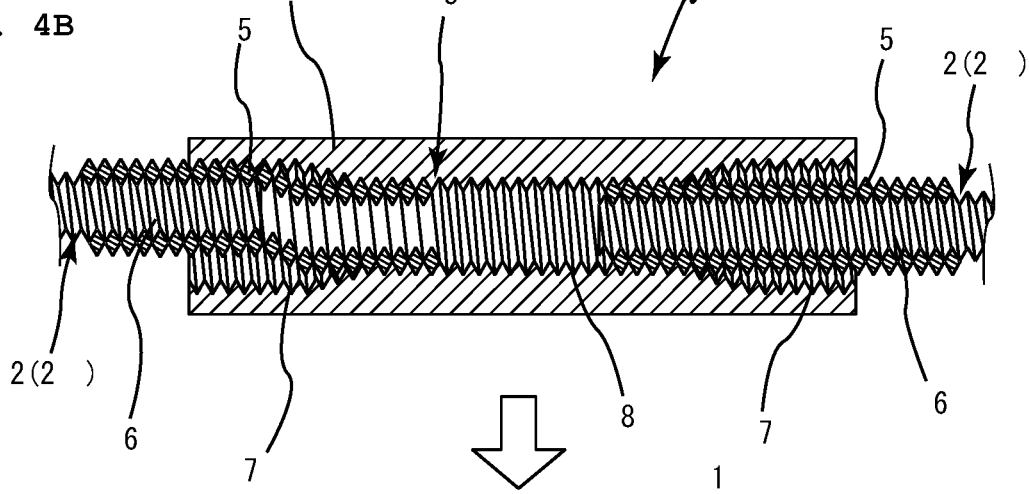
Figure 4C:
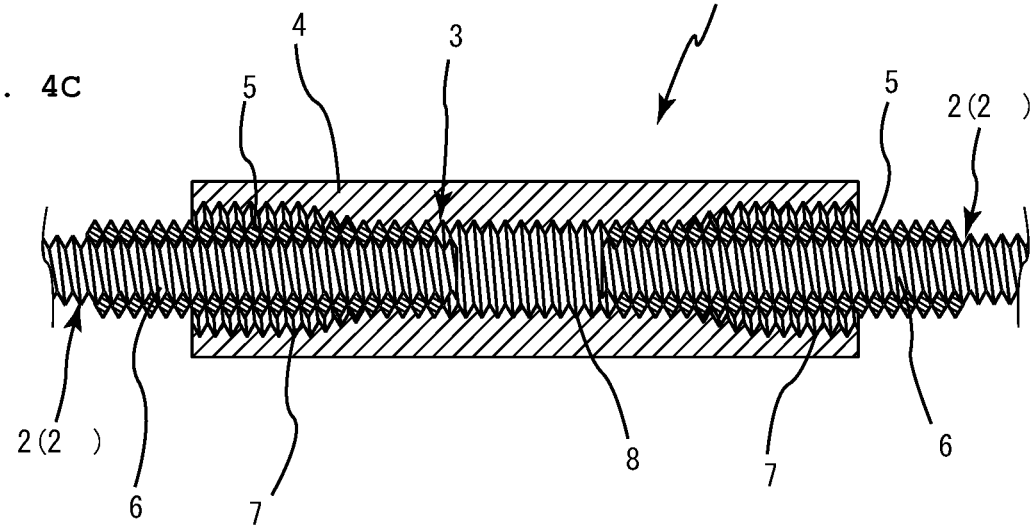
Figure 6:
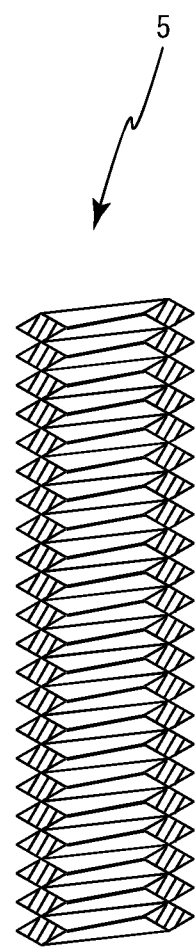

As a result of the spring 5 being provided in this manner, even in cases in which the center of the long bolt 2 (2') that is attached to the lower-level beam 9 and the center of the long bolt 2 (2") that is attached to the upper-level beam 10 are misaligned, for example, as shown in FIGS. 4A, 4B and 4C, a tip end portion of the bolt 2 is inserted into the interior of the spring 5. The spring 5 serves as a guide and guides the tip end portion of the long bolt 2 to the large-diameter portion 7. As a result of the bolt 2 or the high nut 4 being subsequently rotated so as to fasten the bolt 2, the bolt 2 is screwed in an inward direction of the high nut 4 along the thread of the female screw portion 3 and the spring 5. Misalignment of the bolts 2 is gradually resolved.

Because misalignment of the bolts 2 can be resolved by the springs 5, the female screw portion 3, and the large-diameter portions 7 in this manner, even when the bolt 2 that has a large diameter is used, for example, the bolts 2 of the upper level and the lower level can be easily connected.

Furthermore, as a result of the bolt 2 or the high nut 4 being rotated, the spring 5 and the male screw portion 6 enter the interior of the small-diameter portion 8 of the female screw portion 3. As shown in FIG. 5, the spring 5 is screwed so as to be in close contact with the threads of the female screw portion 3 and the male screw portion 6.

As a result of the spring 5 being placed in close contact (a state of substantial surface contact) with the threads of the female screw portion 3 and the male screw portion 6, a backlash gap (clearance) between the female screw portion 3 and the male screw portion 6 is filled by the spring 5. A working effect of locking by frictional force of the spring 5 can be achieved.

Because a state of substantial surface contact is achieved in this manner, shear force hardly acts on the female screw portion 3 and the male screw portion 6. The spring 5 can receive the generated shear force. Here, various types of materials can be used for the spring 5. In addition, hardness and the like can be freely modified. Therefore, even without the bolt 2 and the high nut 4 being subjected to a quenching process or the like, joining strength can be improved by the quenching process or the like being performed on the spring 5.

Here, according to the present embodiment, a configuration in which the high nut 4 is used by itself to connect the bolts 2 is described. However, a nut for a so-called double nut may be placed in contact with the high nut 4, and the locking effect may be more firmly achieved.

Even in cases in which a nut for a double nut such as this is used, a nut that has a larger diameter than the outer diameter of the bolt 2 can be used. All that is required is that the nut be screwed to the spring 5 from near the end portion of the high nut 4. The nut for a double nut can be easily moved and fastened.

Figure 7A:
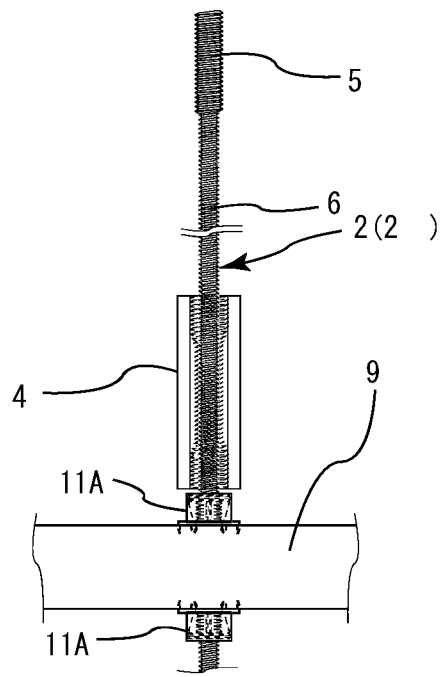
Figure 7B:
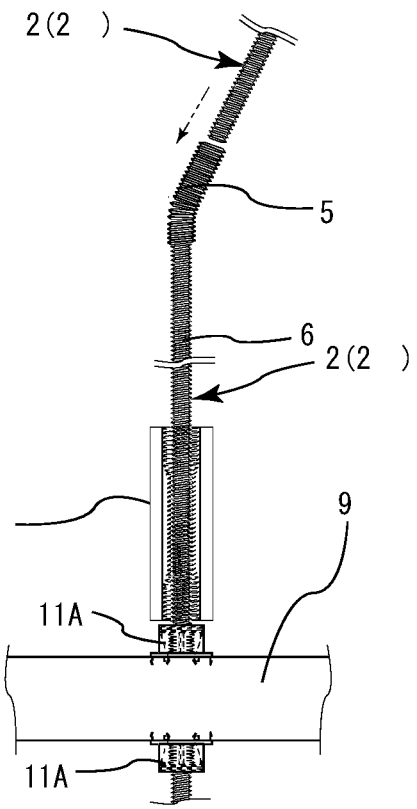
Figure 7C:
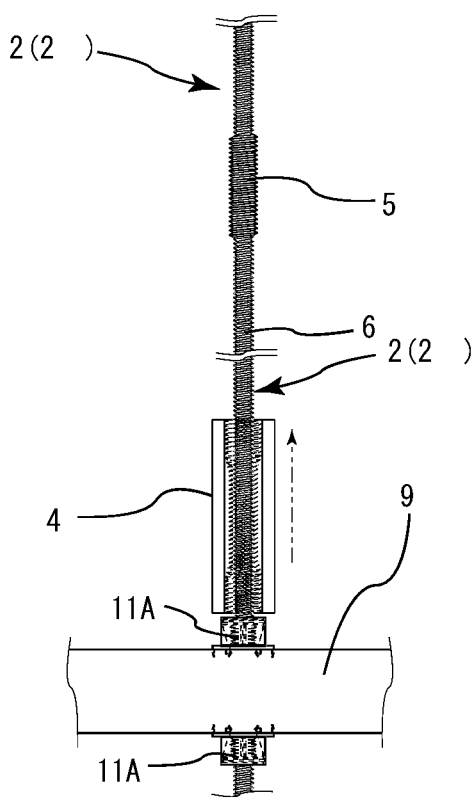

When the bolt connector 1 of the present invention is used, misalignment and the like can be prevented even when the bolts 2 are simply passed through the upper- and lower-level beams 9 and 10 and connected by the bolt connector 1. The bolts 2 can be easily connected to each other. However, for example, as shown in FIGS. 7A, 7B and 7C, the bolt 2 (2') is attached to the lower-level beam 9. The high nut 4 is fitted (in a loosely fitted state) onto the bolt (2'), and the spring 5 is screwed to the bolt (2') near the tip end portion of the bolt 2 (2').

Subsequently, the spring 5 is bent and the tip end portion of the bolt 2 (2") is screwed to the other end portion. The bolt 2 (2") is then attached to the upper-level beam 10. The high nut 4 is moved to the connecting portion of the bolts 2 and fastened. As a result, the bolts 2 can be easily connected to each other. When the bolts 2 are connected, a state such as that in FIG. 8 is achieved.

Here, regarding a nut 11 that fixes the bolts 2 to the upper- and lower-level beams 9 and 10, a nut 11A that has nut segments may be used. Alternatively, an ordinary nut 11 may be used.

When the ordinary nut 11 is used, the nut 11 that has a larger diameter than the outer diameter of the bolt 2 may be used and fastened using the spring 5.

Other Embodiments for Carrying Out the Invention

Next, other embodiments for carrying out the present invention will be described with reference to FIG. 9 to FIG. 18. Regarding the descriptions of the other embodiments for carrying out the present invention, constituent sections that are identical to those according to the above-described first embodiment for carrying out the present invention are given the same reference numbers. Redundant descriptions are omitted.

Figure 9:
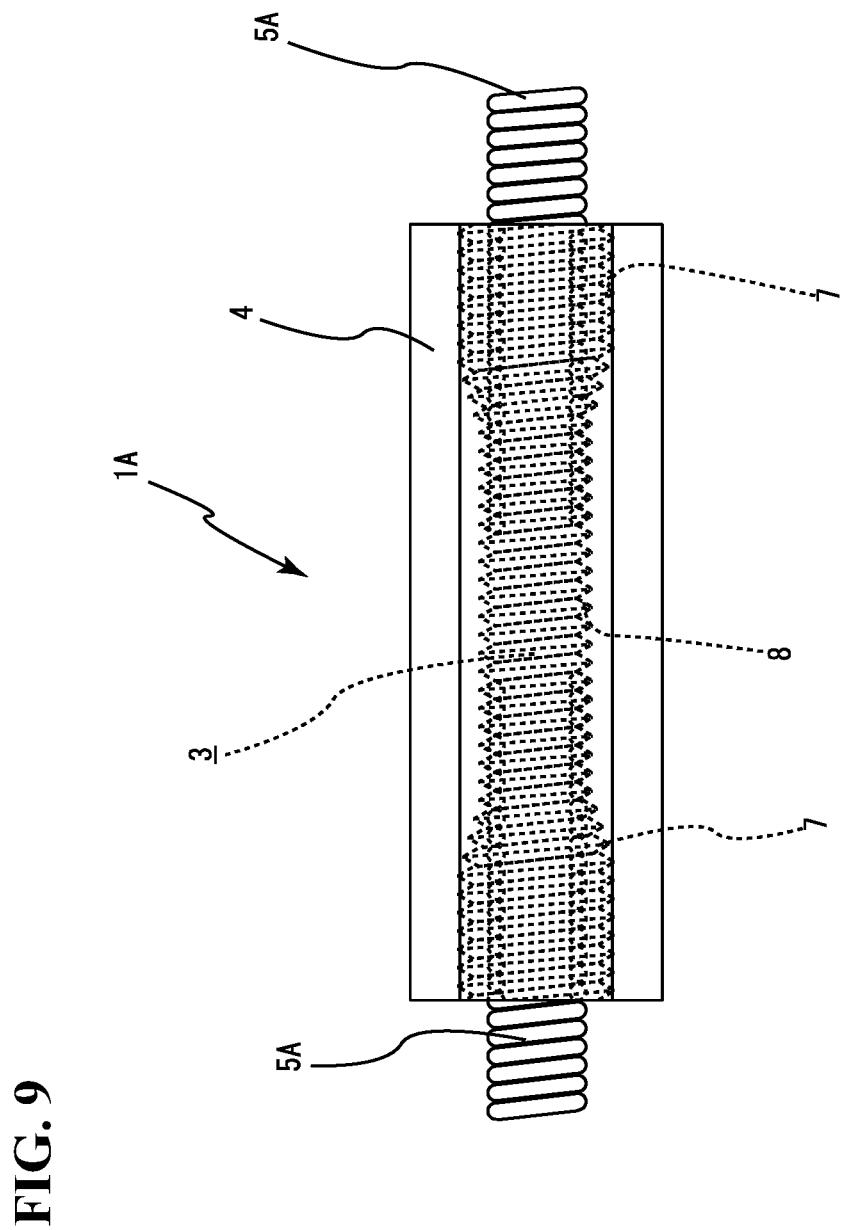
FIG. 9 to FIG. 11 are explanatory diagrams according to a second embodiment of the present invention.
Figure 10:
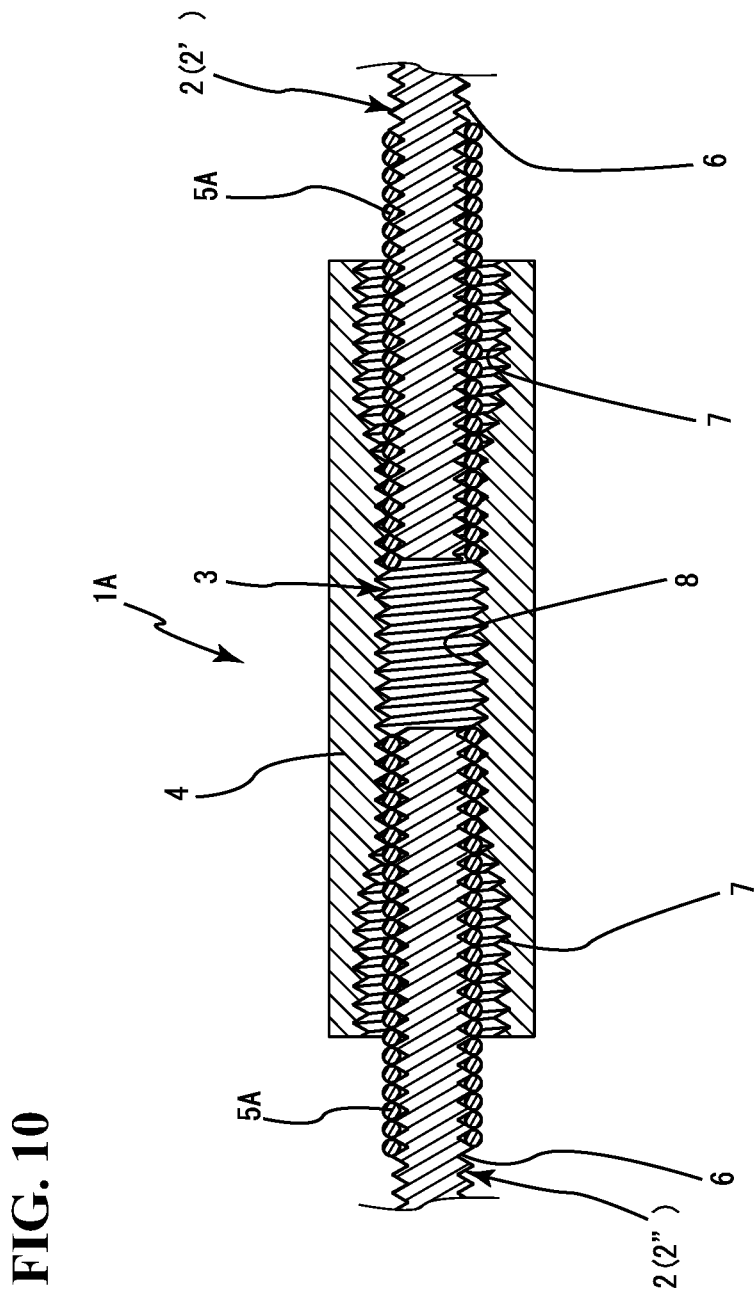
Figure 11:
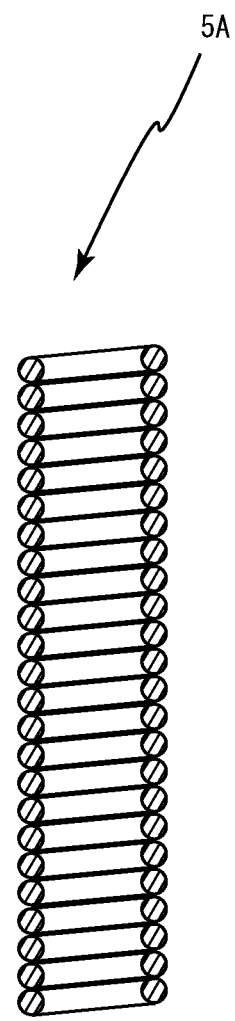

A second embodiment for carrying out the present invention, shown in FIG. 9 to FIG. 11, mainly differs from the first embodiment for carrying out the present invention in that a spring 5A that has a cross-sectional shape that is substantially circular is used. Even in the case of a bolt connector 1A that uses the spring 5A such as this, working effects similar to those according to the above-described first embodiment for carrying out the invention can be achieved.

Here, when the spring 5A that has a substantially circular cross-sectional shape such as that according to the present embodiment is used, as shown in FIG. 10, the spring 5A is formed to have a wire diameter such as that the spring 5A comes into contact with the threads of the female screw portion 3 and the male screw portion 6.

Figure 12:
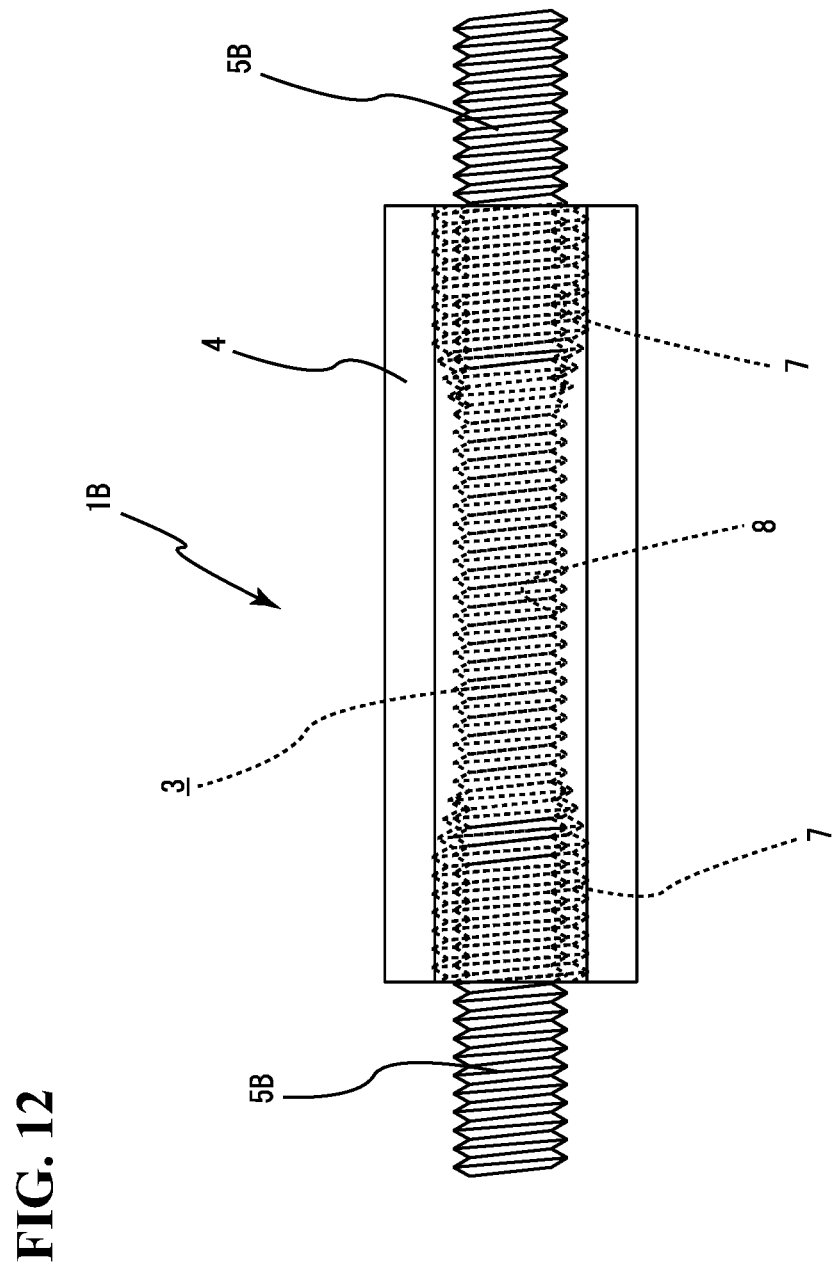
FIG. 12 to FIG. 14 are explanatory diagrams according to a third embodiment of the present invention.
Figure 13:
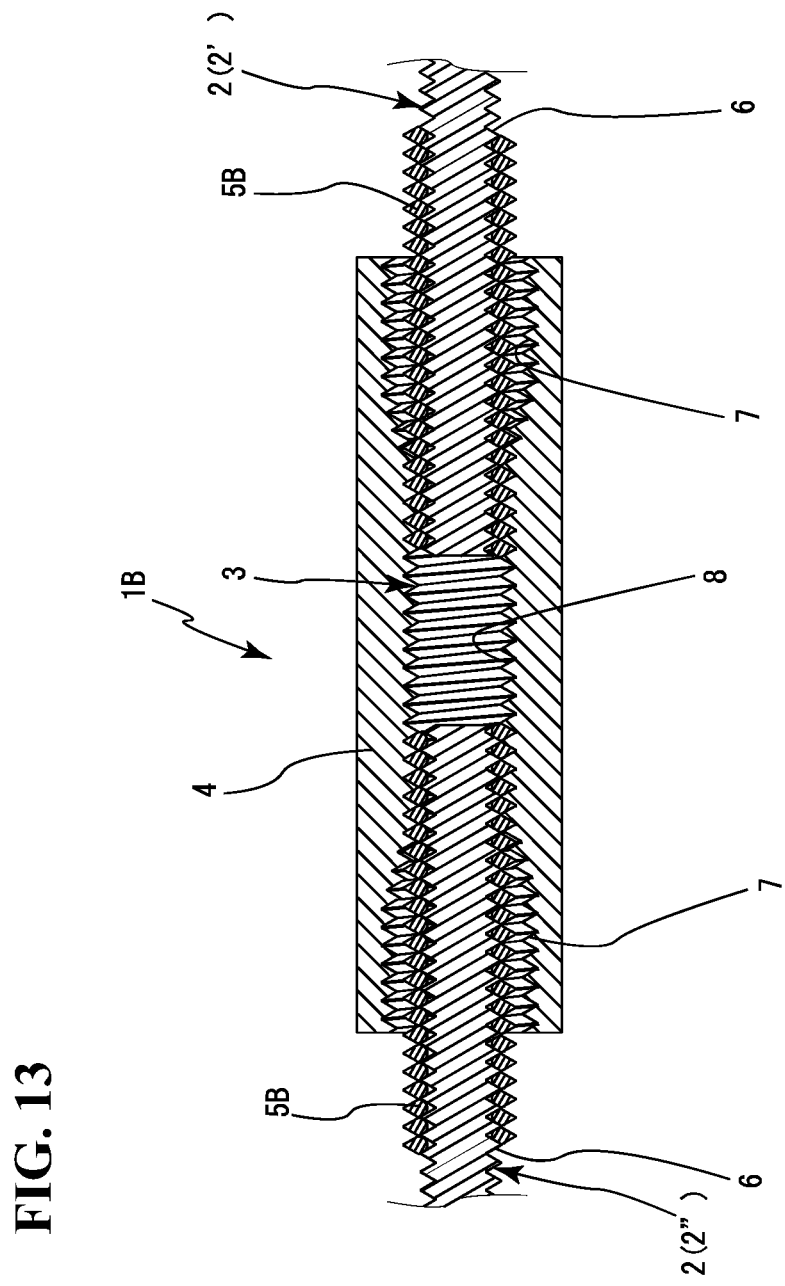
Figure 14:
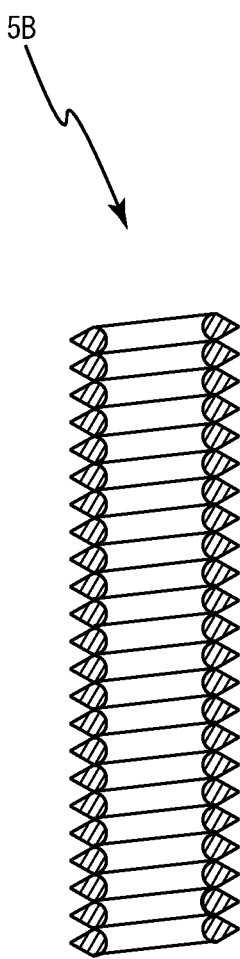
Figure 15:
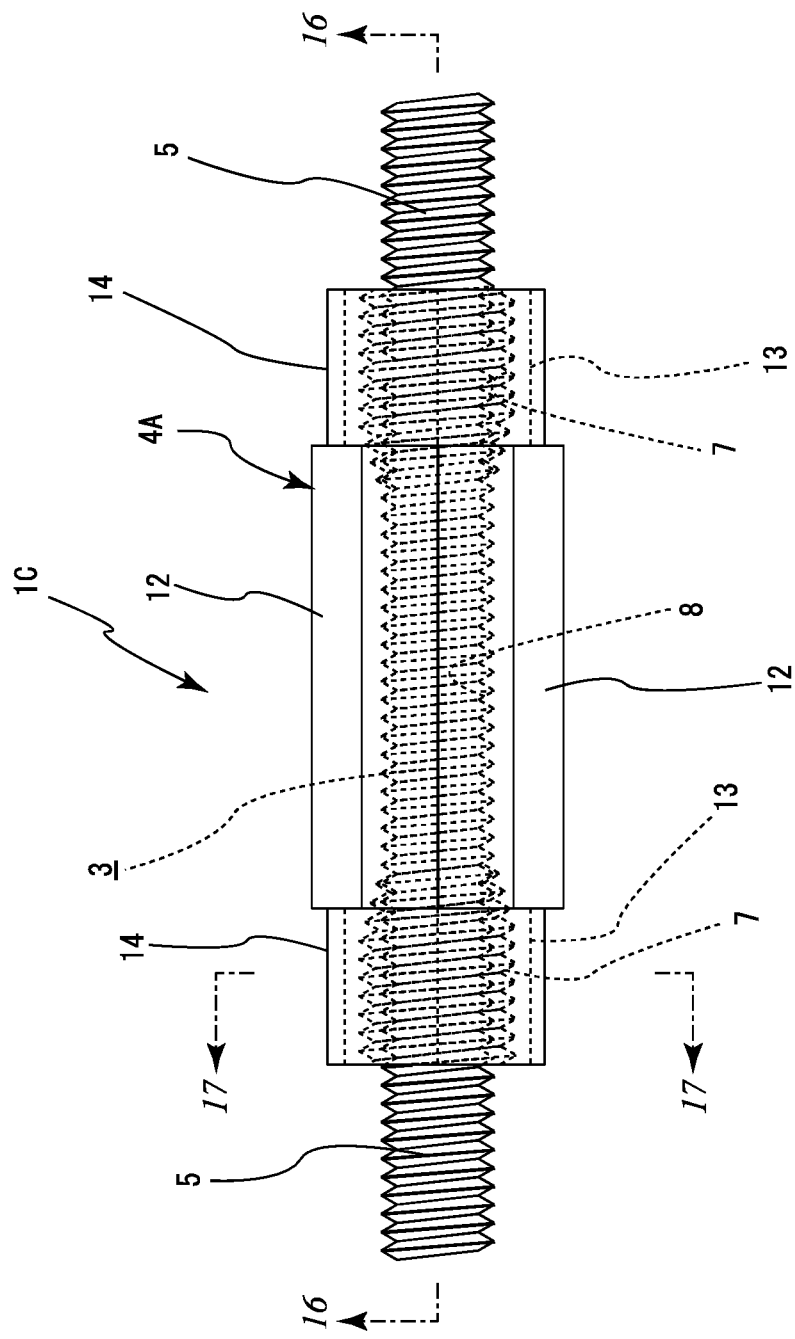
FIG. 15 to FIG. 18 are explanatory diagrams of a fourth embodiment of the present invention.
Figure 16:
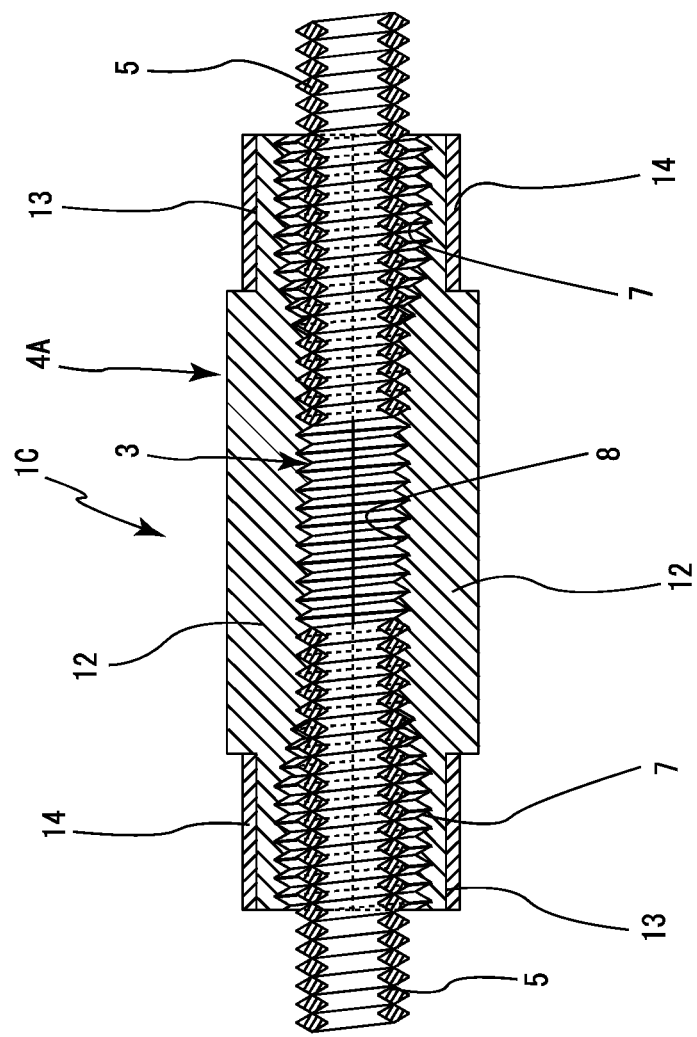
Figure 17:
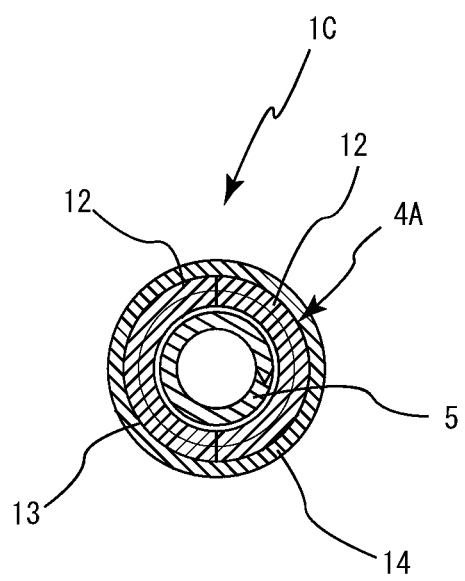
Figure 18:
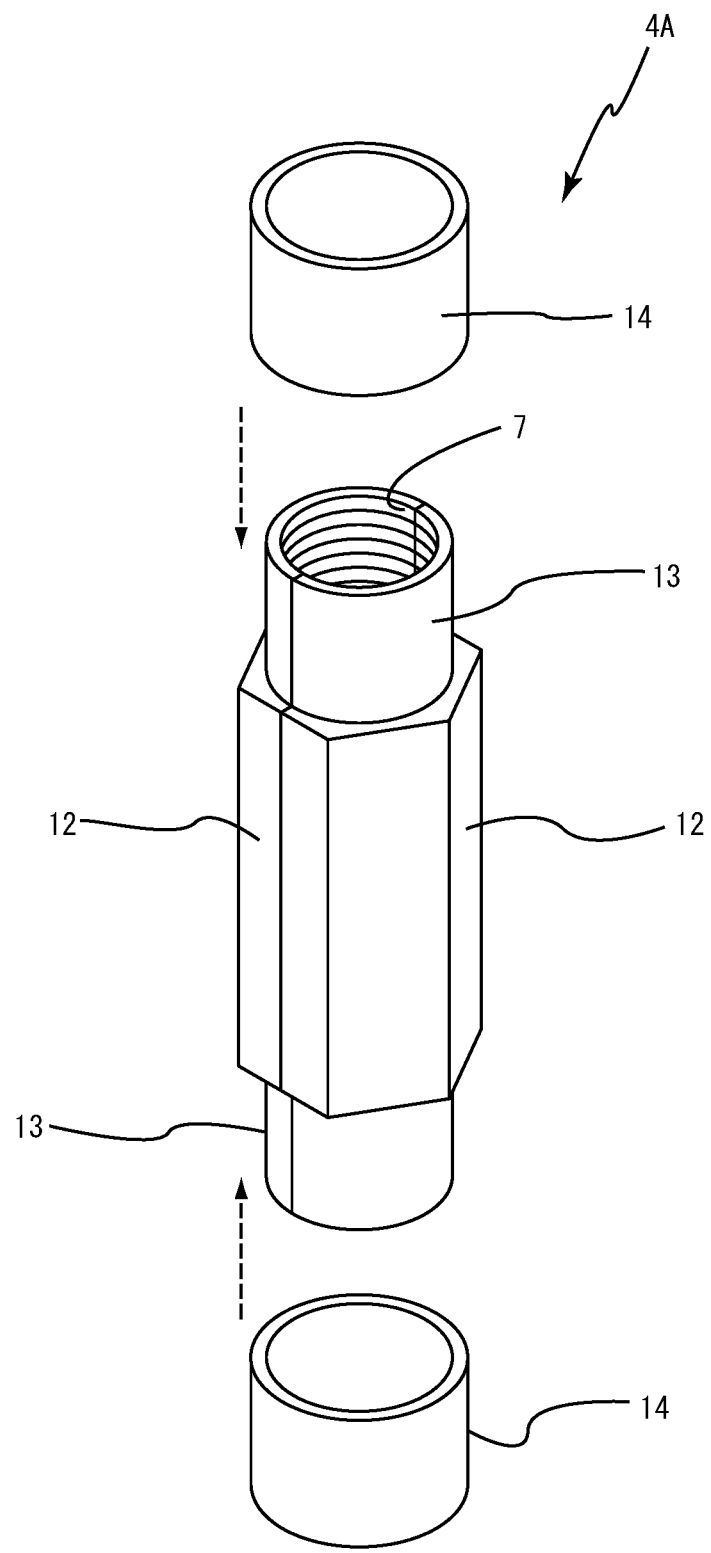

A third embodiment for carrying out the present invention, shown in FIG. 12 to FIG. 14, mainly differs from the first embodiment for carrying out the present invention in that a spring 5B that has a cross-sectional shape that is substantially fan-shaped or substantially teardrop-shaped is used. Even in the case of a bolt connector 1B that uses the spring 5B such as this, working effects similar to those according to the above-described first embodiment for carrying out the invention can be achieved.

A fourth embodiment for carrying out the present invention, shown in FIG. 15 to FIG. 18, mainly differs from the first embodiment for carrying out the present invention in that a high nut 4A is configured by two high-nut main bodies 12 that are formed by the high nut 4A being divided into two in an axial direction, an engaging portion 13 that is provided near each of an upper end and a lower end of the high-nut main body 12, and a ring-shaped engaging tool 14 that is attached to the engaging portion 13 and integrates the two high-nut main bodies 12. Even in the case of a bolt connector 1C that uses the high nut 4A such as this, working effects similar to those according to the above-described first embodiment for carrying out the invention can be achieved. In addition, insertion of the spring and the like can be facilitated.

The engaging portion 13 of the high nut 4A according to the present embodiment is formed into a substantially cylindrical small-diameter portion. The ring-shaped engaging tool 14 engages with the engaging portion 13 that is in the form of the small-diameter portion, in a substantially press-fitted state, and the high-nut main bodies 12 are thereby integrated.

Engagement may be performed in this manner, using the ring-shaped engaging tool 14. However, a screw portion may be formed in the engaging portion 13. The engaging tool 14 that is screwed to the screw portion may be used, and the high-nut main bodies 12 may be integrated by the engaging tool 14 being screwed to the engaging portion 13.

Here, the high nut 4A may be divided to form three or more high-nut main bodies 12. Even in the case of a configuration such as this, working effects similar to those according to the present embodiment can be achieved.

Here, according to the embodiments of the present invention, a bolt connector that uses a high nut in which only a forward screw is formed is described. However, the bolt connector may be that which uses a high nut in which a forward screw and a reverse screw are formed, such as a turnbuckle.

In addition, a female screw portion that is continuously formed from one end portion to the other end portion of the high nut is described. However, the female screw portion may be formed only near the center portion (only in the small-diameter portion) of the high nut. Portions near both end portions may be formed into holes in which a screw is not formed. Here, the diameter of the portion in which the screw is not formed may be substantially the same as the diameter of the small-diameter portion.

Furthermore, the female screw portion may be such that the large-diameter portion is not formed, and only the small-diameter portion is formed from one end portion to the other end portion.

INDUSTRIAL APPLICABILITY

The present invention is used in an industry for manufacturing bolt connectors and an industry for constructing wooden housing.

What is claimed is:

1. A bolt connector configured to connect two bolts, the bolt connector comprising:
   a high nut that includes a female screw portion, opposite end portions of the female screw portion each being configured to receive one of the bolts; and
   two springs, each of the springs having a portion thereof inserted into a respective one of the end portions of the female screw portion and each of the springs having a portion thereof extending outside the high nut in a lengthwise direction of the high nut, wherein
   the female screw portion is formed configured to have a larger diameter than an outer diameter of the bolt, and
   each spring is formed into a shape in which the respective inserted portion of each of the springs is in contact with threads of the respective end portion of the female screw portion into which each spring is inserted and also configured to be in contact with a male screw portion of one of the bolts in a state in which one of the bolts or the high nut is rotated and fastened, and the bolt connector is configured so that there is still a portion of each of the springs extending outside the high nut in a lengthwise direction of the high nut in the state in which one of the bolts or the high nut is rotated and fastened.

2. The bolt connector according to claim 1, wherein:
   each of the end portions of the female screw portion is of a larger diameter than a diameter of the female screw portion between the end portions.

3. The bolt connector according to claim 1, wherein:
   the spring has a cross-sectional shape that is substantially rhombic.

4. The bolt connector according to claim 1, wherein:
   the spring has a cross-sectional shape that is substantially teardrop-shaped or fan-shaped.

5. The bolt connector according to claim 1, wherein:
   the high nut is a turnbuckle.

6. The bolt connector according to claim 1, wherein:
   the high nut is comprised of a plurality of high nut main bodies that are divided in an axial direction;
   wherein engaging portions are formed near opposite end portions of each high nut main body of the plurality of high nut main bodies; and
   wherein engaging tools our attached to the engaging portions of each high nut main body so as to integrate the plurality of high nut main bodies.

* * * * *